(12) United States Patent
Cohen et al.

(10) Patent No.: US 11,645,720 B2
(45) Date of Patent: *May 9, 2023

(54) MULTI-CHANNEL COGNITIVE DIGITAL PERSONAL LINES PROPERTY AND CASUALTY INSURANCE AND HOME SERVICES RATE QUOTING, COMPARISON SHOPPING AND ENROLLMENT SYSTEM AND METHOD

(71) Applicant: PATTY, LLC, Deerfield Beach, FL (US)

(72) Inventors: Seth Cohen, Lighthouse, FL (US); Luis Silvestre, Miramar, FL (US)

(73) Assignee: PATTY, LLC, Deerfield Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,862

(22) Filed: Aug. 3, 2020

(65) Prior Publication Data

US 2021/0035230 A1 Feb. 4, 2021

Related U.S. Application Data

(60) Provisional application No. 62/956,856, filed on Jan. 3, 2020, provisional application No. 62/930,171, filed
(Continued)

(51) Int. Cl.
*G06Q 40/00* (2023.01)
*G06Q 40/08* (2012.01)
(Continued)

(52) U.S. Cl.
CPC ............ *G06Q 40/08* (2013.01); *G06F 40/35* (2020.01); *G06N 5/042* (2013.01); *G06Q 30/0277* (2013.01); *G06Q 30/0282* (2013.01)

(58) Field of Classification Search
CPC ............... G06Q 40/08; G06Q 30/0277; G06Q 30/0282; G06F 40/35; G06F 40/30; G06N 5/042; G06N 20/00; G06N 3/006
See application file for complete search history.

(56) References Cited

U.S. PATENT DOCUMENTS 8,793,147 B2 7/2014 Bradshaw et al.
9,495,700 B2 11/2016 Hoch et al.
(Continued)

FOREIGN PATENT DOCUMENTS

KR 20190051904 5/2019
KR 20190065840 6/2019
(Continued)

OTHER PUBLICATIONS

Rafailidis et al: "The Technological Gap Between Virtual Assistants and Recommendation Systems", Cornell University, Computer Science arXiv:1901.00431, revised Jan. 6, 2019 (Year: 2019).*
(Continued)

*Primary Examiner* — Edward J Baird
(74) *Attorney, Agent, or Firm* — Porzio Bromberg & Newman P.C.

(57) ABSTRACT

An anthropomorphic, artificial intelligence-based system and method to quote, compare, and purchase personal lines and commercial lines property and casualty insurance or benefits products and services and quoting, comparing, purchasing, or transferring residential services using a cognitive virtual assistant. The system and method collects information from an online advertising platform during the process and returns the collected information to the online advertising platform for optimization of the online advertising platform.

17 Claims, 9 Drawing Sheets

Related U.S. Application Data on Nov. 4, 2019, provisional application No. 62/891,777, filed on Aug. 26, 2019, provisional application No. 62/887,962, filed on Aug. 16, 2019, provisional application No. 62/886,393, filed on Aug. 14, 2019, provisional application No. 62/881,706, filed on Aug. 1, 2019.

(51) Int. Cl.
*G06N 5/04* (2023.01)
*G06F 40/35* (2020.01)
*G06Q 30/0241* (2023.01)
*G06Q 30/0282* (2023.01)

(56) References Cited

U.S. PATENT DOCUMENTS

| | | | |
|---|---|---|---|
| 9,812,151 | B1 | 11/2017 | Amini et al. |
| 9,996,881 | B2 | 6/2018 | Mdeway |
| 2010/0070307 | A1 | 3/2010 | Sinvhal-Sharma |
| 2011/0041153 | A1* | 2/2011 | Simon ............... H04N 21/4532 709/204 |
| 2013/0275210 | A1* | 10/2013 | Johnson ............. G06Q 30/0269 705/14.48 |
| 2014/0304011 | A1* | 10/2014 | Yager ................ G06Q 30/0621 705/4 |
| 2015/0178849 | A1* | 6/2015 | Berger ................ G06Q 40/08 705/4 |
| 2016/0034838 | A1* | 2/2016 | Gembicki .......... G06Q 10/0639 705/7.39 |
| 2017/0161758 | A1 | 6/2017 | Towriss |
| 2017/0278117 | A1* | 9/2017 | Wallace ............. G06Q 30/0271 |
| 2018/0060981 | A1* | 3/2018 | Sher .................... G06Q 50/163 |
| 2018/0082683 | A1* | 3/2018 | Chen .................. G06F 21/6263 |
| 2018/0204111 | A1 | 7/2018 | Zadeh et al. |
| 2018/0285978 | A1* | 10/2018 | Groarke ................ G06Q 40/08 |
| 2019/0026364 | A1* | 1/2019 | Sankovsky ........ G06Q 30/0207 |
| 2019/0035040 | A1 | 1/2019 | Goel |
| 2019/0138996 | A1 | 5/2019 | Salvi et al. |
| 2019/0171351 | A1 | 6/2019 | Kilchenko et al. |
| 2019/0332400 | A1* | 10/2019 | Spoor .................... G06F 9/453 |
| 2020/0412744 | A1* | 12/2020 | Spurlock ............... G06N 7/005 |

FOREIGN PATENT DOCUMENTS

| | | | |
|---|---|---|---|
| WO | 20190048941 A1 | 3/2019 | |
| WO | WO-2021006918 A1 * | 1/2021 | ......... G06Q 30/0207 |

OTHER PUBLICATIONS

International Search Report, PCT/US20/44775, dated Oct. 22, 2020.
Elafris; https://www.elafris.com/for-agents/; 2019.

* cited by examiner

10

31 - Initiating a session through an interface with a virtual assistant

32 - Virtual assistant prompts the user to answer a series of pre-qualifying questions 33 - Adjust parameters of the virtual assistant to accommodate the user 34 - Virtual assistant prompts user for information and receives user's description 35 - Evaluates the user's level of intent or urgency to benefits products 36 - Identify and present relevant benefits products based on eligibility determined by responses from the user 37 - Scan network scan a network of live agents licensed or registered in a resident state of a user to identify an agent offering benefits products presented to the user during the session of benefits producers 14 - Cognitive digital assistant engages in conversation with a user for underwriter requirements information and receives user's description

211 - Initiating a session through an interface with a cognitive digital assistant 212 - Cognitive virtual assistant prompts the user to answer a series of preliminary questions directed to a requested service 213 - Adjust parameters of the cognitive virtual assistant to accommodate the user 214 - Cognitive digital assistant prompt engages in conversation with a user for information and receives user's description 215 - User's responses stored 216 - Identify and present relevant benefits products of one or more third-party benefits providers

FIG. 3A

MULTI-CHANNEL COGNITIVE DIGITAL PERSONAL LINES PROPERTY AND CASUALTY INSURANCE AND HOME SERVICES RATE QUOTING, COMPARISON SHOPPING AND ENROLLMENT SYSTEM AND METHOD

BACKGROUND OF THE INVENTION

Field of the Invention

The present invention relates to an anthropomorphic, artificial intelligence-based system and method to quote, compare, and purchase personal lines and commercial lines property and casualty insurance or benefits products and services (hereinafter "benefits product(s)") and quoting, comparing, purchasing, or transferring residential services such as high-speed internet, live TV service, streaming TV service, landline telephone service, mobile cellular phone service, home security, and home automation products and services (hereinafter "home service(s)") from an insurance benefits provider, benefits company, service provider, or similar entities (hereinafter "benefits provider(s)"). For example, benefits products can include personal lines policies such as auto, boat, motorcycle, and recreational vehicles, pet insurance, travel, accident, home, renters or apartments, condominium or townhouse, umbrella, inland marine, flood insurance; commercial lines policies such as business owner, abuse or molestation, fidelity, cybersecurity; and related products including, for example, life and annuity products. The invention provides a cognitive digital process via phone, mobile device, tablet, app, wearable computer device, SMS, chat, iMessage, videoconference, virtual reality, game or game system (hereinafter "method(s) of communication").

Description of Related Art

The property and casualty benefits product industry has changed and there is potential for disruption. Customers have easy online access to competitive rate information and options in the shopping and servicing of their policies. Often products are tied directly to other shopping events such as buying a home or automobile. For example, Carvana.com, an online used car and financing website, has changed the approach to the sale of used automobiles, including some limited forms of coverage on cars purchased from them. The conventional path to purchase insurance has transformed with the advent of technology, smartphones and digital assistants. Many benefits product purchases are made in conjunction with other purchases leveraging information and need at the point another product such as, equipment, property automobile or boat is purchased. Easy seamless ways of leveraging the point of sale information at these transactions and allowing the customer to comparison shop and have questions answered immediately through the media of their choice has become common in the marketplace.

Consumers expect and demand convenience, speed, automation and simplicity. Any unnecessary additional effort, incremental steps or inconvenience that leads the consumers to abandon their purchase journey is defined as 'friction'. Friction may occur offline or online, and includes subjecting consumers to unnecessarily wait, queue, click, type, tap, add information or fill-in forms. The consumers may also have to load, buffer, switch channels/windows or hold for service. It can hinder efficiency and impact the consumer experience, adversely affecting the consumer purchase journey.

With consumers empowered like never before and expecting greater access and more personalized touch points, insurers need to ensure they are proficient in providing an omnichannel experience. This includes an ecosystem of digital offerings, such assisted online, responsive or mobile-optimized websites, and mobile apps.

Shoppers who use digital offerings during the shopping experience are more satisfied with the quote process than shoppers who use traditional channels. Assisted online, for instance, is only used by 6% of shoppers, yet the average quote satisfaction among these shoppers is 773, or 62 points higher than quote satisfaction among website shoppers. Notably, this "people plus digital" solution currently yields the highest satisfaction with the quote process.

Benefits providers are falling short in terms of providing customers with relevant and personalized digital experiences. According to Centric Digital (Digital Benchmark Agency), 42% of insurers do not meet best practices related to digital cross-channel personalization. With Amazon and InsureTech companies setting the pace for personalization and reduced transactional friction, insurers will increasingly be expected to provide tailored digital experiences or get disrupted by someone who does. For example, consumers struggle to understand their own individual flood risk and potential need for flood insurance coverage. Private flood insurers can simplify the agent/consumer experience. Insurers can rate properties at a resolution of only several meters, with better matching of price-to-risk, leading to greater perceived value. Agents could potentially obtain the most critical rating information instantly with just the address and the coverage amount of a policy. The combination of more automated processes and better pricing can reduce expenses and confusion, benefiting both agents and consumers, while consumer awareness of increasing flood risk may be building after recent high-profile flood events, such as Hurricane Harvey in Houston in 2017.

As a necessary part of the property and casualty insurance and benefits product landscape, local agents or producers continue to serve an important role as advisors and intermediaries, but carriers and customers are starting to place less importance on many of the activities traditionally performed by these local agents, redefining and calling into question what role they will play in the future.

Advances in predictive models are making the role that agents were playing in risk selection and pricing out of date. The agent is also no longer the sole face of the insurance brand since customers are now using a number of different channels to connect with their carrier. Auto insurance, which equals to about 70 percent of personal lines premiums, has become commoditized.

Carriers and customers are now interacting more directly keeping the costs down and increasing customer service levels. While the agent commission structures remain mostly unchanged, the once clear division of labor between carrier and agent is diminishing. In addition, given that the financial and insurance markets are under continuous regulatory scrutiny the ability to be and stay compliant continues to be a challenge.

It is desirable to provide an unbiased, artificial intelligence-based system using cognitive digital processing with the customer's channel preference, such as phone, mobile device, tablet, app, wearable computer device, SMS, chat, iMessage, videoconference, virtual reality, game or game system and a method to identify the consumer's available coverage options based on eligibility, assist in the comparison of different options, and automatically enroll the consumer into selected plans available from various insurers.

Likewise, the home services industry has changed and there is added potential for disruption. Consumers have easy online access to competitive products, pricing information, and options in the shopping and servicing of their home services. Often products and services are tied directly through promotions such as bundling discounts (Double, Triple and Quad plays), with many wireless promotions being tied to purchasing new devices, trading in older devices, or promotions involving a buy one, get one device special. The conventional path to purchase home services has transformed with examples such as smartphones and digital assistants and will continue to change. Many high-speed Internet or mobile cellular phone service purchases are made in conjunction with other purchases, such as insurance, leveraging information and need at the point another product such as live TV service, streaming service, or home automation is purchased. Easy seamless ways of leveraging the point of sale information at these transactions and allowing the customer to comparison shop and have questions answered immediately through the method of communication of their choice has become common in the marketplace.

Home services companies and contact centers are falling short in terms of providing customers with relevant and personalized digital experiences. According to Centric Digital (Digital Benchmark Agency), 50% of companies do not meet best practices related to digital cross-channel personalization and proficiency. With companies such as Amazon, Uber, and Starbucks setting the pace for personalization and reduced transactional friction, companies will increasingly be expected to provide tailored digital experiences or get disrupted by someone who does.

For example, consumers struggle to understand Internet upload and download speeds, streaming service options and premium channels, or tiered or unlimited data plans. Home services contact centers and companies can simplify the consumer experience. The combination of more automated processes and better pricing can reduce expenses and confusion, benefiting both representatives and consumers, while consumer awareness of speed, costs, and package options increase.

As a necessary part of the home service industry, contact center representatives continue to serve an important role as advisors and intermediaries, but companies and customers are starting to place less importance on many of the activities traditionally performed by these representatives, redefining and calling into question what role they will play in the future. Home services companies and consumers are now interacting more directly keeping the costs down and increasing customer service levels. While the representative sales bonus structures and key performance indicators remain mostly unchanged, the division of labor between home services companies and representatives is diminishing.

In addition, given that internet service providers and mobile cellular service companies are under continuous regulatory scrutiny, the ability to be and stay compliant as new generations of technology are developed and implemented across the nation continues to be a challenge. It is desirable to provide an unbiased, artificial intelligence-based system using cognitive digital processing with the customer's method of communication preference, such as phone, mobile device, tablet, app, wearable computer device, SMS, chat, iMessage, videoconference, virtual reality, game or game system and a method to identify the consumer's available coverage options based on eligibility, assist in the comparison of different options, and automatically enroll the consumer into selected plans available from various home services providers.

SUMMARY OF THE INVENTION

The present invention relates to an anthropomorphic, artificial intelligence-based system and method to quote, compare, and purchase personal lines and commercial lines property and casualty insurance or benefits products and services and quoting, comparing, purchasing, or transferring residential services such as high-speed internet, live TV service, streaming TV service, landline telephone service, mobile cellular phone service, home security, and home automation products and services (hereinafter "benefits product(s) or product(s)") from an insurance benefits provider, benefits company, service provider, or similar entities (hereinafter "benefits provider(s) or provider(s)"). For example, benefits products can include personal lines policies such as auto, boat, motorcycle, and recreational vehicles, pet insurance, travel, accident, home, renters or apartments, condominium or townhouse, umbrella, inland marine, flood insurance; commercial lines policies such as business owner, abuse or molestation, fidelity, cybersecurity; and related products including, for example, life and annuity products. The invention provides a cognitive digital process via phone, mobile device, tablet, app, wearable computer device, SMS, chat, iMessage, videoconference, virtual reality, game or game system (hereinafter "method(s) of communication").

The process of real time optimization can use an application-programming interface (API) to relay critical performance metrics from a cognitive virtual assistant to online advertising platforms. The online advertising platforms can be search engines, such as for example, Google Adwords, Microsoft Bing, and Yahoo Gemini. Search engines are online advertising platforms that offer advertisers the ability to purchase an ad listing which prompts the consumer to visit a website or call a phone number if the consumer types a specified search query. In addition, real-time optimization of referring search marketing campaigns occurs via application programming interface (API) by relaying critical performance metrics from the cognitive virtual assistant to an online third-party search engine or lead aggregator bidding platforms. In one embodiment, the online bidding platform uses a ping post method to allow a lead seller to send partial information, the "ping", of a lead to their network of lead buyers. The buyer then determines whether he or she would like to purchase the lead based on this information and obtains contact information from the seller via the "post."

Search engines often display multiple advertisers' ads for the same search query and give full control to the advertiser over the search queries they choose to display their ads on. The ad position for each unique search query is determined primarily by a maximum cost-per-click (CPC) which dictates the highest amount that an advertiser is willing to spend for a click on a website advertisement or a phone call. In addition to specifying a max CPC for each keyword query, the advertiser is also given tools to increase or decrease their max CPC based upon demographics of the consumer, such as, for example, for auto a VIN number, license plate, state, and number of miles and for homeowners an address, zip code, type of dwelling, age of home, type of construction, and square footage. In similar fashion, the appropriate metadata can be collected for pet insurance, life and annuity products, high-speed Internet service, mobile cellular, and live TV services. In all cases, environmental factors can be collected, such as, for example, time of day and day of week. Every unique ad listing that a search engine displays to a consumer can take the above factors into consideration to determine a final ad position.

In the present invention, if the consumer chooses to click through an ad listing of the advertiser, a click tracking identification (ID) is generated by the search engine which is unique to the consumer's click. The click tracking ID can be linked back to the consumer whether they choose to complete an insurance application or to purchase a Home Service online or call in from the website and complete an application or purchase over the phone.

In the present invention, the process of optimization can use an application programming interface (API) from the cognitive virtual assistant to deliver a status of the application back to the search engine using a status tracking identification (ID) generated by the search engine. By delivering the performance data, such as for example, successful applications from the cognitive virtual assistant to the search engine, real time performance of each unique keyword query on an application level can be determined along with performance factors, such as for example, for a VIN number, license plate, state, and number of miles, and for homeowners products the address, zip code, type of dwelling, age of home, type of construction, and square footage. In similar fashion, the appropriate metadata can be collected for pet insurance, life and annuity products, mobile cellular, live TV, and streaming services. In all cases, environmental factors can be collected, such as, for example, time of day and day of week.

The system can make real time, automatic optimization using the search engines API to control max CPC and demographic specific bids based upon current application performance to, in turn, optimize marketing spend and drive future applications automatically. The consumer (also "user") or system initiates a session with the other by phone, mobile device, tablet, app, wearable computer device, SMS, chat, iMessage, videoconference, virtual reality, game or game system. For voice sessions, the system's audio interfaces allow multi-language bidirectional speech-based conversations between the cognitive virtual assistant and the user. As the user speaks to the cognitive virtual assistant, the process of automated speech recognition (ASR) digitally converts audible speech into transcribed text. Through natural language processing, including sentiment and tone analysis, the system evaluates the meaning and context of the transcribed text and adjusts the language and tone of the cognitive virtual assistant's responses accordingly to accommodate the user. The system's context-switching capability allows the user to interrupt and restart any embedded process while retaining the user's information. The system can include episodic memory to allow the cognitive virtual assistant to recall details from previous segments of the current conversation or previous conversations altogether. The cognitive virtual assistant can be implemented in a conversational manner for receiving information from a user and generating responses using cognitive learning abilities during the conversation. The cognitive learning abilities of the cognitive virtual assistant can also include analytic memory for understanding trend of data, affective memory for understanding emotion and deep back projection networks (DBPN) for learning process flows via empirical learning. The cognitive virtual assistant can be considered to be a "trusted" virtual producer, agent, or representative.

In one embodiment, once a session is initiated, the user is introduced to the cognitive virtual assistant trained to generate rate quotes, prices and packages, compare available coverage options, and enroll the consumer into selected plans available from various benefits providers. The cognitive virtual assistant follows a roadmap embedded in a semantic memory for guiding the user through the session. It allows the cognitive virtual assistant to engage in conversation with the user while restricting the conversation to benefits product options, pricing, comparison shopping and enrollment topics and processes. In some embodiments, the user can be referred to the cognitive virtual assistant by an internet search engine, social media ad, or other internet-based performance marketing platforms. The system captures the user's referral metadata including referring website URL, search phrase or ad clicked, geolocation, Internet Protocol (IP) address, and other values for analytics and optimization. Once a session is initiated, the user is introduced to a cognitive virtual assistant trained to generate rate quotes, compare available coverage options, and enroll the consumer into selected plans available from various providers.

The cognitive virtual assistant can prompt the user to answer a series of pre-qualifying questions to determine available product and service options. In one embodiment, in order to generate a quote for an individual to list rates and details for coverage options for one proposed insured, the cognitive virtual assistant can request the following information from the user for auto a VIN number, license plate, state, and number of miles, and for homeowners an address, zip code, type of dwelling, age of home, type of construction, and square footage. In an alternate embodiment, the appropriate metadata can be collected for pet insurance, life and annuity products, mobile cellular, live TV, and streaming services. Responses from the user are stored in memory of the system. The system can invoke an application programming interface (API) to connect to one or more third-party benefits provider quoting servers to obtain available plan or pricing options from the providers for the consumer. Responses from the one or more providers' rate quoting servers can contain quoting details, including, for example, plan descriptions, premiums and coverage areas, tiered options, or limitations. The cognitive virtual assistant can review the received responses and relay the received responses or a subset of the received responses to the user by voice, text, or email at the user's preference. The system can utilize underwriting guidelines from insurers together with user stated preferences, eligibility and affordability to sort and highlight recommended coverage options to the user.

The user can select one or more products or services from the provider's options and proceed to purchase or enroll for the selected option(s) including new, upgraded, or transferring of service. The one or more product can be selected by specifying the one or more product names or one or more unique identifiers to the cognitive virtual assistant.

Once the one or more products are selected, the system can invoke an application programming interface (API) to connect to one or more third-party benefits provider servers to obtain application requirements for the selected benefits product options. The cognitive virtual assistant prompts the user to provide information directed to the application requirements for the selected benefits product option(s). Responses from the user can be stored in memory while collecting information from the user for each data field required on the enrollment or purchase application for the selected benefits product option(s). Upon satisfaction of the application, enrollment or purchase requirements for the selected benefit product options, the system invokes an application programming interface (API) call to one or more third-party provider servers corresponding to the one or more third party benefits provider servers to submit the enrollment, application or purchase and obtain a policy identification (ID) or confirmation of submission or purchase information. It will be appreciated that in some embodiments the third-party benefits provider application server can be the same server as the third-party benefits provider enrollment server. The response from the third-party benefits provider enrollment server can contain additional fulfillment material from the insurer for the user to be insured or the system can schedule an installation or self-install. The system can relay the additional fulfillment material to the user by voice, text or email at the user's preference. The cognitive virtual assistant can also present cross-sell opportunities to the consumer.

In one embodiment, upon completion of the purchase or enrollment process, the system invokes an application programming interface (API) connect to a referring third-party internet marketing ad campaign server to report conversion details for the originating search phrase or ad clicked. The system periodically calculates ad-level conversion metrics and initiates an automated audience selection (AAS) process. The automated audience selection (AAS) process calibrates the associated marketing campaign's scheduled geographic exposure and spending parameters via the application programming interface (API) to regulate traffic and conversion cost.

The system can provide security of the user interface and transmitted data. In one embodiment, data encryption can be used during transport of data.

The invention will be more fully described by reference to the following drawings.

BRIEF DESCRIPTION OF THE DRAWINGS

FIGS. 1A-1D are flow diagrams of one embodiment of a method for interactively collecting information for optimization of online advertising platforms and presenting relevant insurance products, services or benefits based on eligibility to the user and enrolling of the user with determined insurance products, services or benefits performed by a system of the present invention.

FIGS. 3A-3D are flow diagrams of one embodiment of a method for interactively collecting information for optimization of online advertising platforms and presenting relevant residential services products or services based on eligibility to the user and enrolling of the user with determined products and services performed by a system of the present invention.

DETAILED DESCRIPTION

Figure 1A:
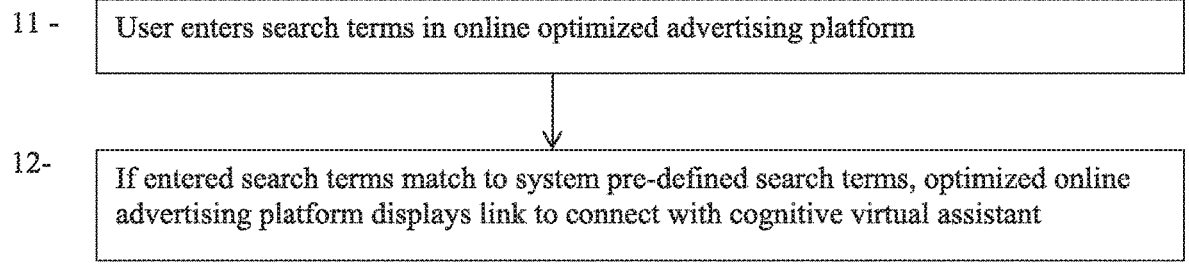
Figure 1B:
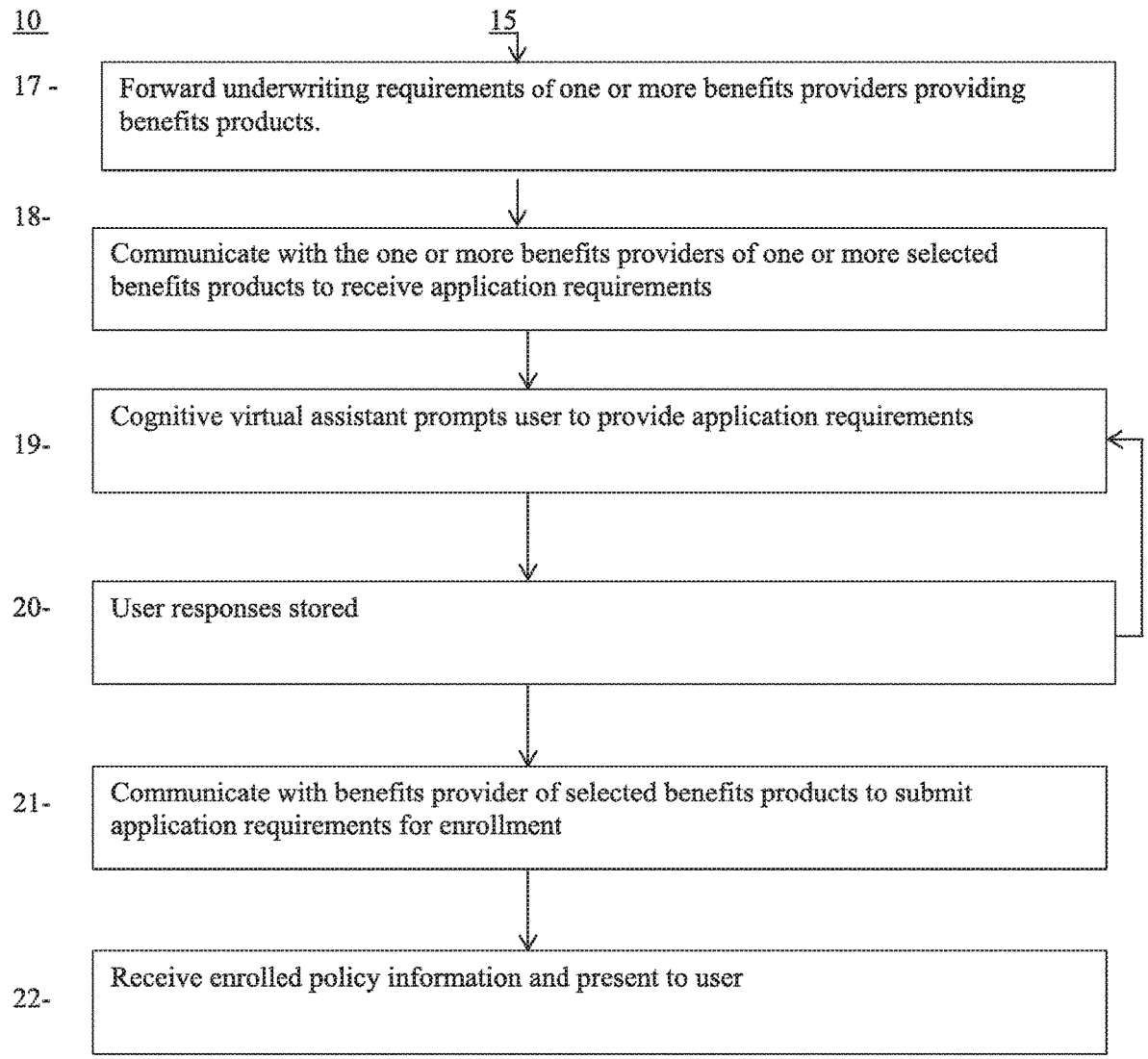

Reference will now be made in greater detail to a preferred embodiment of the invention, an example of which is illustrated in the accompanying drawings. Wherever possible, the same reference numerals will be used throughout the drawings and the description to refer to the same or like parts.

As used in this application, the terms "component", "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

FIGS. 1A-1D are flow diagrams of an embodiment of interactive method 10 for interactively collecting information for optimization of online advertising platforms and presenting relevant benefits products services based on eligibility to the user and enrolling of the user with determined benefits products.

In step 11, a user enters one or more search terms in an optimized online advertising platform. The optimized online advertising platform can be a search engine, such as for example, Google Adwords, Microsoft Bing, and Yahoo Gemini. Alternatively, the optimized online advertising platform can include online third-party lead aggregator bidding platform. The online advertising platform can be optimized using historical performance data and real time performance metrics collected from the user with a cognitive virtual assistant as discussed below.

In step 12, if the one or more entered search terms match system pre-defined search terms the optimized online advertising platform displays a link to connect with a cognitive virtual assistant. The pre-defined search terms can relate to search phrases for benefits products such as, for example "affordable auto insurance", "affordable homeowners insurance", "cell service", for high-speed Internet service "transfer service from one address to another," "upgrade service," or other appropriate search parameters for pet, life or annuity insurance or other home services. An example link to connect to the cognitive virtual assistant can be in the form of establishing a telephone call with the cognitive virtual assistant. Alternatively, the link can be an associated number of the cognitive virtual assistant, which can be used by the user to establish a call with the cognitive virtual assistant.

In step 21, a session with a cognitive virtual assistant is initiated from the link provided by the online advertising platform. The user can be a buyer or consumer or system. For example, the user can initiate the session with the system using an interface of a phone, mobile device, tablet, app, wearable computer device, SMS, chat, iMessage, videoconference, virtual reality, game or game system. Once a session is initiated, in step 21, the user is introduced to a cognitive virtual assistant. The cognitive virtual assistant can greet and prompt the user to answer a series of pre-qualifying questions in step 22. In one embodiment, the system can internalize the user's answers and not repeat questions, which limits buyer or consumer frustration. For a voice session, an audio interface of the system allows multi-language bidirectional speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the cognitive virtual assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is artificial intelligence based to receive voice via an audio interface, which is transferred to a server to be interpreted with artificial intelligence. Responses from the server can be sent back via audio to the user's audio interface.

In step 23, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including for example Sentiment Analysis, Tone Analyzer, and Personality Insights to adjust parameters of the cognitive virtual assistant.

In step 24, the cognitive virtual assistant engages in conversation to prompt the user to provide information and describe the benefits products that are of interest to the user for purchase. In one embodiment, the cognitive virtual assistant can request the following information from the user such as, for example, a VIN number, license plate, state, number of miles, an address, zip code, type of dwelling, age of home, type of construction, and square footage. The cognitive virtual assistant can request appropriate metadata be collected for any of the benefits products the user is considering. In step 25, responses from the user are stored in memory of the system. Step 24 and step 25 can be repeated for collecting additional information from the user directed to desired coverage options.

In step 26, one or more relevant benefits products of one or more third-party benefits providers are identified to the user through the cognitive virtual assistant based on eligibility determined by responses from the user to the cognitive virtual assistant. In one embodiment, the system can invoke an application programming interface (API) to call to one or more third-party provider rate quoting servers to obtain available coverage options from third-party providers for the quoted benefits product(s). Responses from the one or more benefit provider rate quoting servers can contain rate quoting details, including, for example, plan descriptions, premiums, limitations, data allowance caps and internet speed options. The cognitive virtual assistant can review the received responses and present the received responses or a subset of the received responses to the user by voice, text, or email at the user's preference.

In step 27, the user can select one or more benefits products which can include options to quote, compare, purchase, upgrade, and transfer benefits products from one address to another. The one or more benefits products can be selected by the user specifying the one or more plan names or one or more unique identifiers to the cognitive virtual assistant.

In step 28, the system can communicate with one or more third-party benefits providers of one or more selected benefits products to receive application or enrollment requirements. In one embodiment, the system can invoke an application programming interface (API) call to one or more third-party benefits provider application servers to obtain application requirements for the selected options.

In step 29, the cognitive virtual assistant prompts the user to provide information directed to the application requirements for the selected benefits product option(s). In step 30, responses from the user can be stored in memory. Step 29 and step 30 can be repeated for collecting information from the user for each data field required on the application for the selected coverage option. The system can review the collected information to ensure that application requirements for the selected options are satisfied. If the application requirements are not satisfied, steps 29 and 30 can be repeated.

In step 31, the system communicates with one or more third-party providers of selected benefits products to submit application requirements for enrollment or purchase. In one embodiment, the system invokes an application programming interface (API) call to one or more third-party benefits providers servers corresponding to the one or more third-party benefit provider processing servers to submit the application, enrollment, or purchase and obtain a policy ID, or the selected benefits product confirmation. In one embodiment, the virtual assistant automatically transfers the user to the selected benefits provider for enrollment. In step 32, the system receives enrolled benefits product policy information and presents the received information to the user through the cognitive virtual assistant. The response from the third-party benefits provider enrollment server can contain additional fulfillment material from the third-party benefits provider. The system can relay the additional fulfillment material to the user by voice, text or email at the user's preference. The received policy information can be presented to the user by the cognitive virtual assistant.

In step 33, the system collects information from the internet online advertising platform and the cognitive virtual assistant for analytics and optimization. The information can be collected during one or more previously described steps of method 10. The collected information from the cognitive virtual assistant can include, for example, for an automobile policy, a VIN number, license plate, state, and number of miles, and for a homeowners policy an address, zip code, type of dwelling, age of home, type of construction, and square footage, and premium paid by the user. The collected information from the cognitive virtual assistant can include appropriate metadata for pet insurance, life and annuity products, mobile cellular, live TV, and streaming services. The collected information from the advertising platform can include the search phrase originally keyed in by the user, metadata including for example, referring website URL, ad clicked, geolocation, and internet protocol (IP) address.

In step 34, collected information is returned to the online advertising platform for updating optimization. In one embodiment, the optimization includes optimizing ad position for each unique search query to increase or decrease a max CPC based upon demographics of the consumer, such as for example, for auto a VIN number, license plate, state, and number of miles, for homeowners an address, zip code, type of dwelling, age of home, type of construction, and square footage. In similar fashion, the appropriate metadata can be collected for pet insurance, life and annuity products, mobile cellular, live TV, and streaming services. In all cases, environmental factors can be collected, such as, for example, time of day and day of week.

In one embodiment, the collected information includes tracking user clicks using the online advertising platform.

The optimization uses information of whether the consumer chooses to click through an ad listing of the advertiser to generate a click tracking identification (ID) by the online advertising platform which is unique to the consumer's click. The click tracking ID can be linked back to the consumer whether they choose to complete an application or enrollment to select a benefits product online or call in from the website and complete an application or enrollment over the phone using the cognitive virtual assistant.

The process of optimization can use an application programming interface (API) from benefits provider application customer relationship management (CRM) to deliver a status of the application back to the online advertising platform using a status tracking identification (ID) generated by the online advertising platform.

Figure 2:
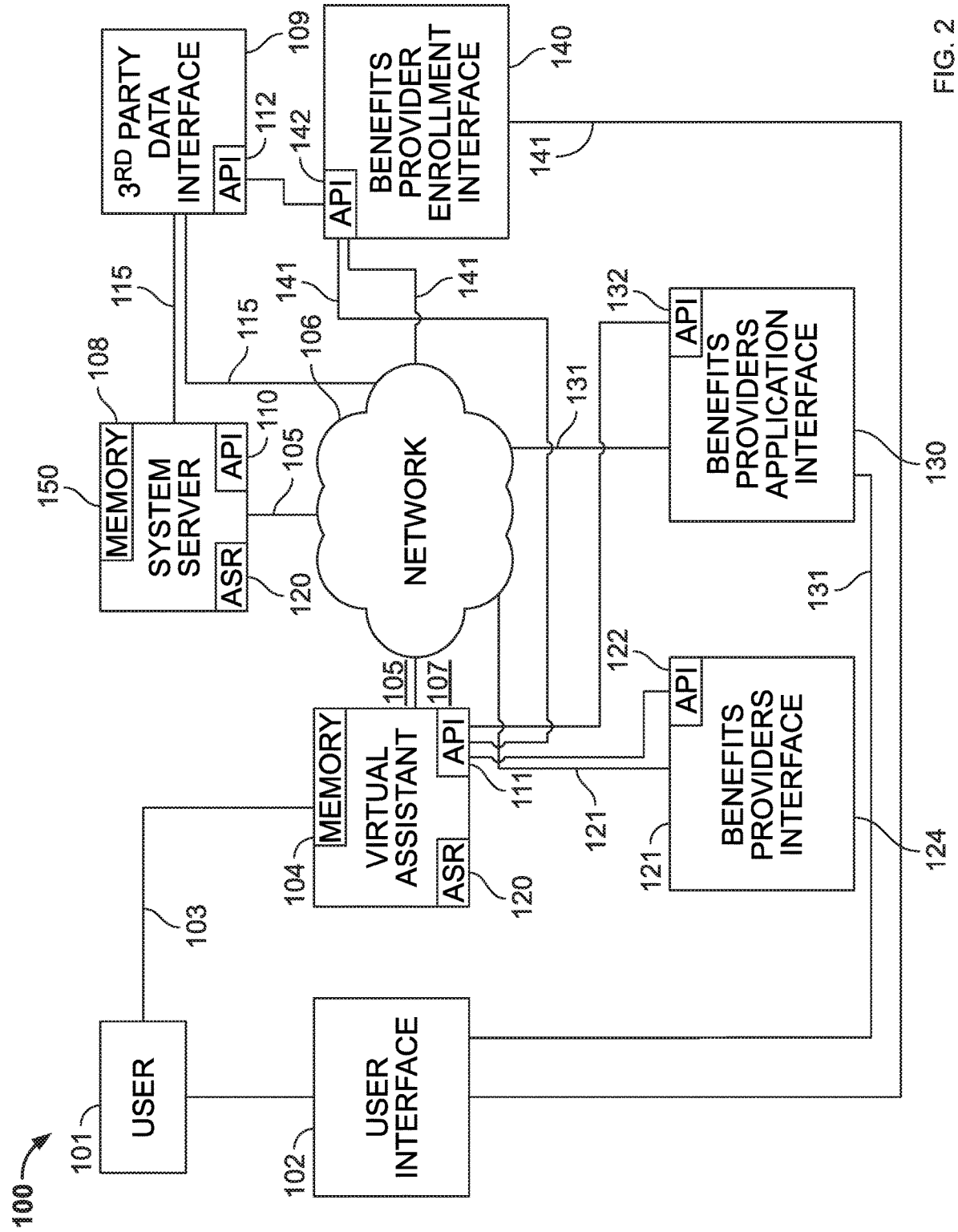
FIG. 2 is a block diagram of an embodiment of an artificial intelligence-based multi-channel system of the present invention for performing FIGS. 1A-1D.
Figure 3B:
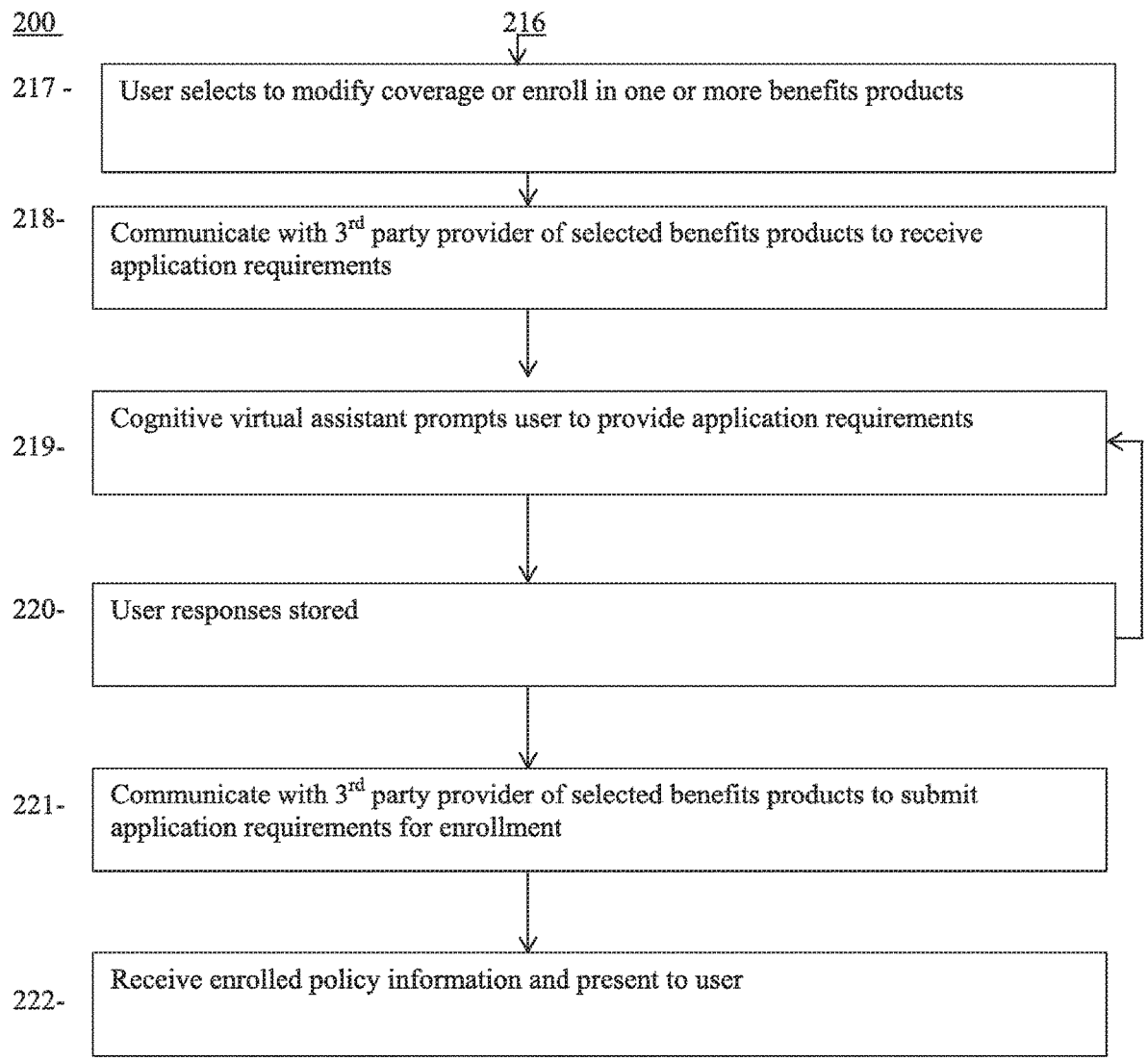
Figure 3C:
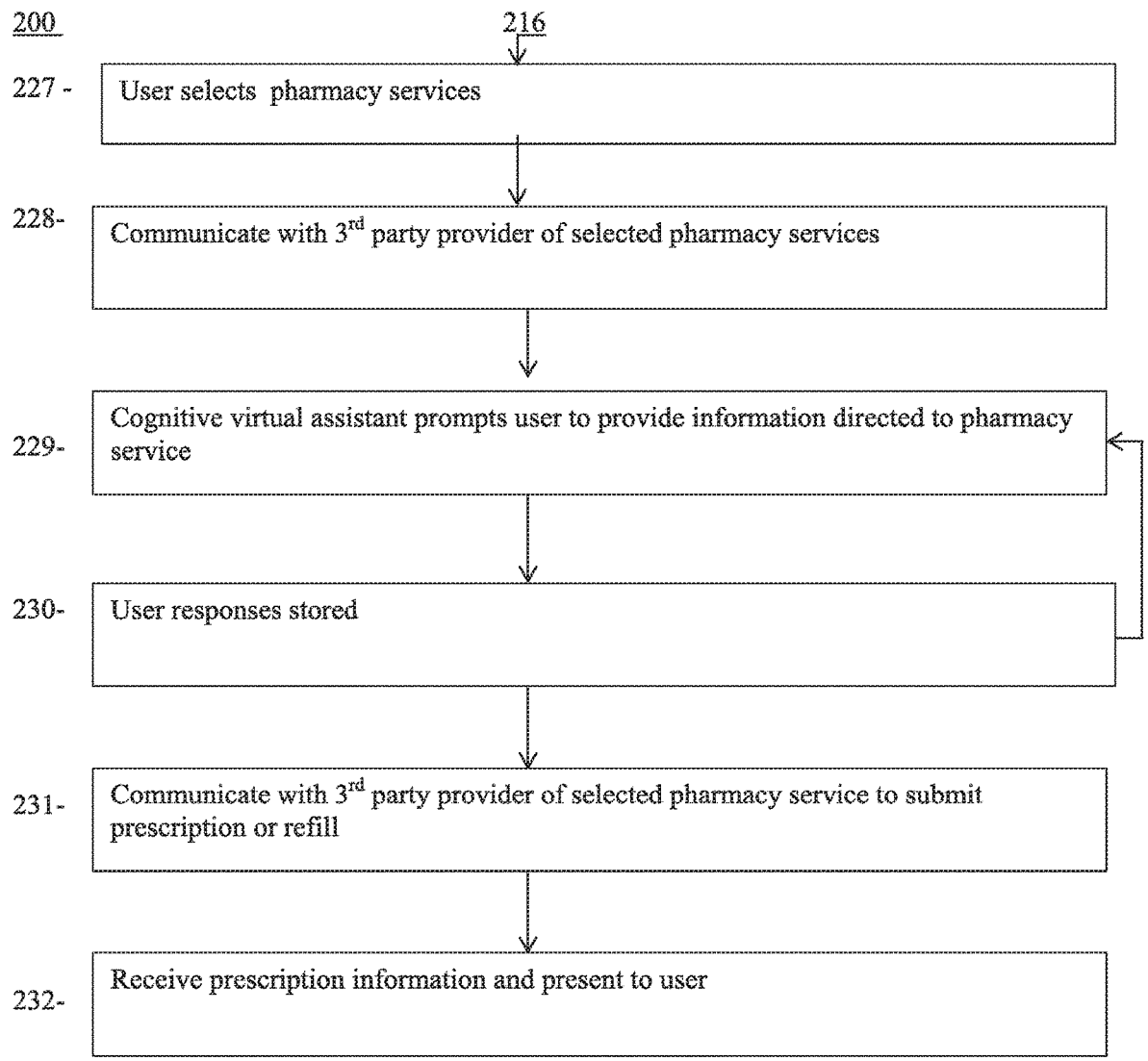
Figure 3D:
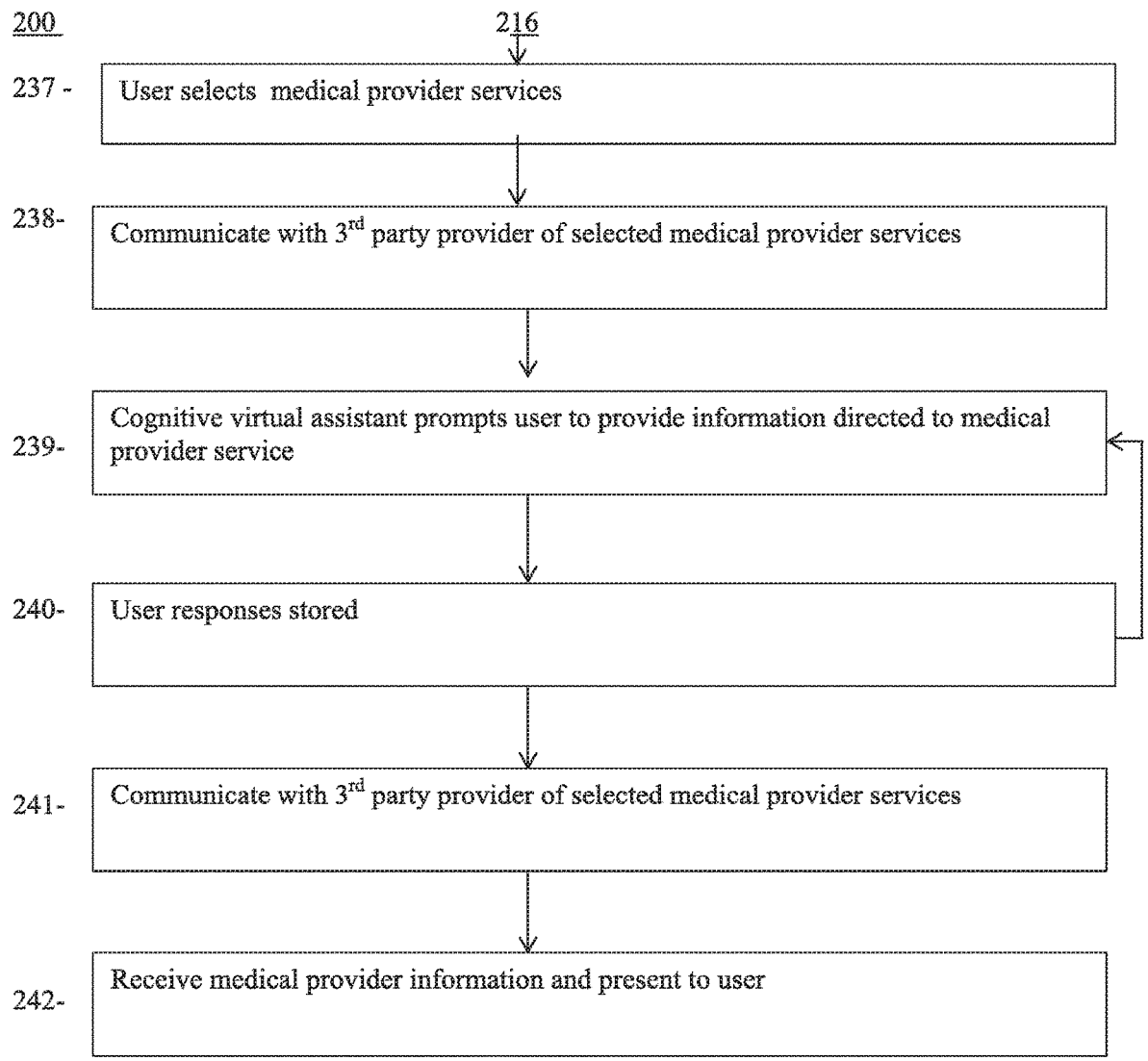

FIG. 2 is a schematic diagram of an implementation of system 100. System 100 communicates with online advertising platform 200. Online advertising platform receives search terms from user 101 and communicates information to user 101. In one embodiment, online advertising platform 200 communicates a link to cognitive virtual assistant 104.

System 100 includes user interface 102 which is accessed by user 101. User interface 102 can be an electronic device such as a mobile telephony device including for example a mobile device, cell phone or smartphone. User interface 102 can include phone, mobile device, tablet, app, wearable computer device, SMS, chat, iMessage, videoconference, virtual reality, game or game system. Mobile telephony devices can communicate with fourth generation (4G) or fifth generation (5G) cellular communications. It will be appreciated that other mobile telephony devices and networks can be used in accordance with the teachings of the present invention. User interface 102 communicates audio or digital information to cognitive virtual assistant 104 over communication path 103.

Cognitive virtual assistant 104 can be a component which is artificial intelligence based. In one embodiment, cognitive virtual assistant receives audio over communication path 103. Audio can be digitized or interpreted by cognitive virtual assistant 104 into data 105. In one embodiment automated speech recognition (ASR) 120 can be performed at cognitive virtual assistant 104 or automated speech recognition (ASR) 121 can be performed at server 108 to digitally convert received audible speech into transcribed text. Cognitive virtual assistant 104 can utilize commercial technologies including for example Sentiment Analysis, Tone Analyzer and Personality Insights to analyze data and adjust parameters of cognitive virtual assistant 104. Cognitive virtual assistant 104 can be implemented in a natural language conversational manner for receiving information from user 101 and automatically generating responses to user 101 during the conversation. Cognitive virtual assistant 104 can have cognitive learning abilities. Cognitive virtual assistant 104 can include natural language processing and context switching. Cognitive virtual assistant 104 can include semantic memory, episodic memory for learning from past conversations, analytic memory for understanding trend of data, affective memory for understanding emotion and deep back projection networks (DBPN) for learning process flows via empirical learning. In some embodiments, the part of speech of content of the utterance of cognitive virtual assistant 104 is determined based on using a natural language parser (e.g., Stanford NLP or others as are known in the art) to parse the utterance. Cognitive virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The part of speech of content of the utterance can indicate if the content is a noun phrase, verb phrase, and/or theme. In some embodiments, the domain of the content of the utterance of cognitive virtual assistant 104 is determined based on pattern matching. Cognitive virtual assistant 104 can include components such as a processor, memory, storage, microphone, learning module, and operating system. An example, cognitive virtual assistant or virtual producer is described in U.S. Pat. No. 9,812,151 hereby incorporated by reference into this application.

Data 105 is transferred over communication path 107 to network 106. Network 106 communicates with system server 108. For example, network 106 can be the Internet. Cognitive virtual assistant 104 may include a server, computer, laptop, PC, mobile device, or the like that includes a processor, a memory, and a communication device. Cognitive virtual assistant 104 and system server 108 may include a plurality of computing devices connected together, e.g., via a network. The processor may include any general purpose or application-specific processor. The memory may include one or more tangible, non-transitory, machine-readable media.

System server 108 accesses third party data interface 109. For example, third party data interface 109 can be an interface to a third-party system for accessing third-party rate quote data. For example, system server 108 can access third-party data 115 directly from databases of third-party providers. In one embodiment, application programming interface (API) 110 of system server 108 or application programming interface (API) 111 of cognitive virtual assistant 104 communicates with application programming interface (API) 112 of third party data interface 109 to access the features or data from third party data interface 109. Alternatively, server 108 can access third party data 115 over network 106. For example, third party data 115 can include third party rate quoting services and carrier specific underwriting guidelines, pricing and requirements from multiple benefits providers for personal lines insurance, commercial lines insurance, property insurance and casualty insurance. In some embodiments, third party data 115 can include data directed to: personal lines policies such as for example auto, boat, motorcycle, recreational vehicles, pet insurance, travel, accident, home, renters, apartments, condominium, townhouse, umbrella, inland marine, and flood insurance. In some embodiments third party data 115 can include data directed to commercial lines policies, such as for example business owner, abuse or molestation, fidelity, cybersecurity. In some embodiments, third party data 115 can include data directed to life and annuity products.

System server 108 or cognitive virtual assistant 104 can connect to benefits provider application interface 130. For example, benefits provider application interface 130 can be an interface to a third-party system for accessing application, enrollment, or purchase requirements data 131. In one embodiment, application programming interface (API) 110 of system server 108 or application programming interface (API) 111 of cognitive virtual assistant 104 communicates with application programming interface (API) 132 of benefits provider application interface 130 to access the features or data from benefits provider application interface 130. Alternatively, system server 108 can access application, enrollment, or purchase requirements data 131 over network 106. For example, application, enrollment, or purchase requirements data 131 can include data fields of the application relating to user information.

System server 108 or cognitive virtual assistant 104 can connect to benefits provider enrollment interface 140. For example, benefits provider enrollment interface 140 can be an interface to a third-party system for accessing enrollment data 141. In one embodiment, application programming interface (API) 110 of system server 108 or application programming interface (API) 111 of cognitive virtual assistant 104 communicates with application programming interface (API) 142 of benefits provider enrollment interface 140 to access the features or data from benefit provider enrollment interface 140. Alternatively, server 108 can access enrollment data 141 over network 106. For example, enrollment data 141 can include benefits provider identification data and fulfillment data. In one embodiment, benefits provider enrollment interface 140 can send application, enrollment, or purchase data 141 directly to user 101 through user interface 102 by voice, text or email. Data 105, third party data 115, application requirements data 131 and enrollment data 141 can be stored in memory 150 of system server 108.

Information collected from cognitive virtual assistant 104 can be forwarded from API 111 to online advertising platform 200 for analytics and optimization. Application requirements data 131 can be forwarded from API 132 to online advertising platform 200. In one embodiment, API 110, API 111, API 112, API 132 and API 142 are web based APIs.

FIGS. 3A-3D are flow diagrams of an embodiment of interactive method 300 for interactively collecting information for optimization of online advertising platforms and presenting relevant residential services products or services based on eligibility to the user and enrolling of the user with determined residential services products or services. Residential services can include home services.

In step 311, a user enters one or more search terms in an optimized online advertising platform. The optimized online advertising platform can be a search engine, such as for example, Google Adwords, Microsoft Bing, and Yahoo Gemini. Alternatively, the optimized online advertising platform can include online third party lead aggregator bidding platform. The online advertising platform can be optimized using historical performance data and real time performance metrics collected from the user with a cognitive virtual assistant as discussed below.

In step 312, if the one or more entered search terms match system pre-defined search terms the optimized online advertising platform displays a link to connect with a cognitive virtual assistant. The pre-defined search terms can relate to search phrases for residential services such as, for example, for high-speed Internet service "transfer service from one address to another," "upgrade service," "affordable cell service" or other appropriate search parameters for other residential services. An example link to connect to the cognitive virtual assistant can be in the form of establishing a telephone call with the cognitive virtual assistant. Alternatively, the link can be an associated number of the cognitive virtual assistant, which can be used by the user to establish a call with the cognitive virtual assistant.

In step 321, a session with a cognitive virtual assistant is initiated from the link provided by the online advertising platform. The user can be a buyer or consumer or system. For example, the user can initiate the session with the system using an interface of a phone, mobile device, tablet, app, wearable computer device, SMS, chat, iMessage, videoconference, virtual reality, game or game system. Once a session is initiated, in step 221, the user is introduced to a cognitive virtual assistant. The cognitive virtual assistant can greet and prompt the user to answer a series of pre-qualifying questions in step 222. In one embodiment, the system can internalize the user's answers and not repeat questions, which limits buyer or consumer frustration. For a voice session, an audio interface of the system allows multi-language bidirectional speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the cognitive virtual assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is artificial intelligence based to receive voice via an audio interface, which is transferred to a server to be interpreted with artificial intelligence. Responses from the server can be sent back via audio to the user's audio interface.

In step 323, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including for example Sentiment Analysis, Tone Analyzer and Personality Insights to adjust parameters of the cognitive virtual assistant.

In step 324, the cognitive virtual assistant engages in conversation to prompt the user to provide information and describe the residential services that are of interest to the user for purchase. In one embodiment, the cognitive virtual assistant can request the following information from the user such as, for example, for high-speed Internet service: home address, zip code, type of dwelling, age of home, type of construction, and square footage. In similar fashion, the appropriate metadata can be collected for mobile cellular, live TV, and streaming services. In step 325, responses from the user are stored in memory of the system. Step 324 and step 325 can be repeated for collecting additional information from the user directed to desired coverage options.

In step 326, relevant residential services products and services of one or more third-party providers are identified based on eligibility determined by responses from the user. In one embodiment, the system can invoke an application programming interface (API) to contact to one or more third-party rate quoting servers to obtain available coverage options from third-party residential services providers for the quoted products or services. Responses from the one or more residential services rate quoting servers can contain rate quoting details, including, for example, plan descriptions, data allowance caps and Internet speed options. The cognitive virtual assistant can review the received responses and present the received responses or a subset of the received responses to the user by voice, text, or email at the user's preference.

In step 327, the user can select one or more residential services products or services which can include options to quote, compare, purchase, upgrade, and transfer residential services from one address to another. The one or more products or services can be selected by the user specifying the one or more plan names or one or more unique identifiers to the cognitive virtual assistant.

In step 328, the system can communicate with one or more third-party residential services providers of one or more selected products or services to receive application or enrollment requirements. In one embodiment, the system can invoke an application programming interface (API) contact to one or more third-party application servers of residential services providers to obtain application requirements for the selected options.

In step 329, the cognitive virtual assistant prompts the user to provide information directed to the application requirements for the selected product or service option. In step 330, responses from the user can be stored in memory. Step 329 and step 330 can be repeated for collecting information from the user for each data field required on the application for the selected coverage option. The system can review the collected information to ensure that application requirements for the selected options are satisfied. If the application requirements are not satisfied, steps 329 and 330 can be repeated.

In step 331, the system communicates with one or more third-party provider of selected residential services product or service to submit application requirements for enrollment or purchase. In one embodiment, the system invokes an application programming interface (API) contact to one or more third-party residential services provider servers corresponding to the one or more third-party processing servers to submit the application, enrollment, or purchase and obtain the selected product or service confirmation. In step 332, the system receives applicable product or service information and presents the received information to the user. The response from the third-party residential services enrollment server can contain additional fulfillment material from the third-party residential services provider. The system can relay the additional fulfillment material to the user by voice, text or email at the user's preference. The received enrollment product or service information can be presented to the user by the cognitive virtual assistant.

In step 333, the system collects information from the internet online advertising platform and the cognitive virtual assistant for analytics and optimization. The information can be collected during one or more previously described steps of method 310. The collected information from the cognitive virtual assistant can include, for example, for high-speed Internet service: home address, zip code, type of dwelling, age of home, type of construction, and square footage. Similarly, the collected information from the cognitive virtual assistant can include appropriate metadata for mobile cellular, live TV, and streaming services. The collected information from the advertising platform can include the search phrase originally keyed in by the user, metadata including for example, referring website URL, ad clicked, geolocation, and internet protocol (IP) address.

In step 334, collected information is returned to the online advertising platform for updating optimization. In one embodiment, the optimization includes optimizing ad position for each unique search query to increase or decrease a max CPC based upon demographics of the consumer, such as for example, for high-speed Internet service: home address, zip code, type of dwelling, age of home, type of construction, and square footage. In similar fashion, the appropriate metadata can be collected for mobile cellular, live TV, and streaming services. In all cases, environmental factors can be collected, such as, for example, time of day and day of week.

In one embodiment, the collected information includes tracking user clicks using the online advertising platform. The optimization uses information of whether the consumer chooses to click through an ad listing of the advertiser to generate a click tracking identification (ID) by the online advertising platform which is unique to the consumer's click. The click tracking ID can be linked back to the consumer whether they choose to purchase a Home Service online or call in from the website and complete a purchase over the phone.

The process of optimization can use an application programming interface (API) from a residential services application customer relationship management (CRM) to deliver a status of the application back to the online advertising platform using a status tracking identification (ID) generated by the online advertising platform.

Figure 4:
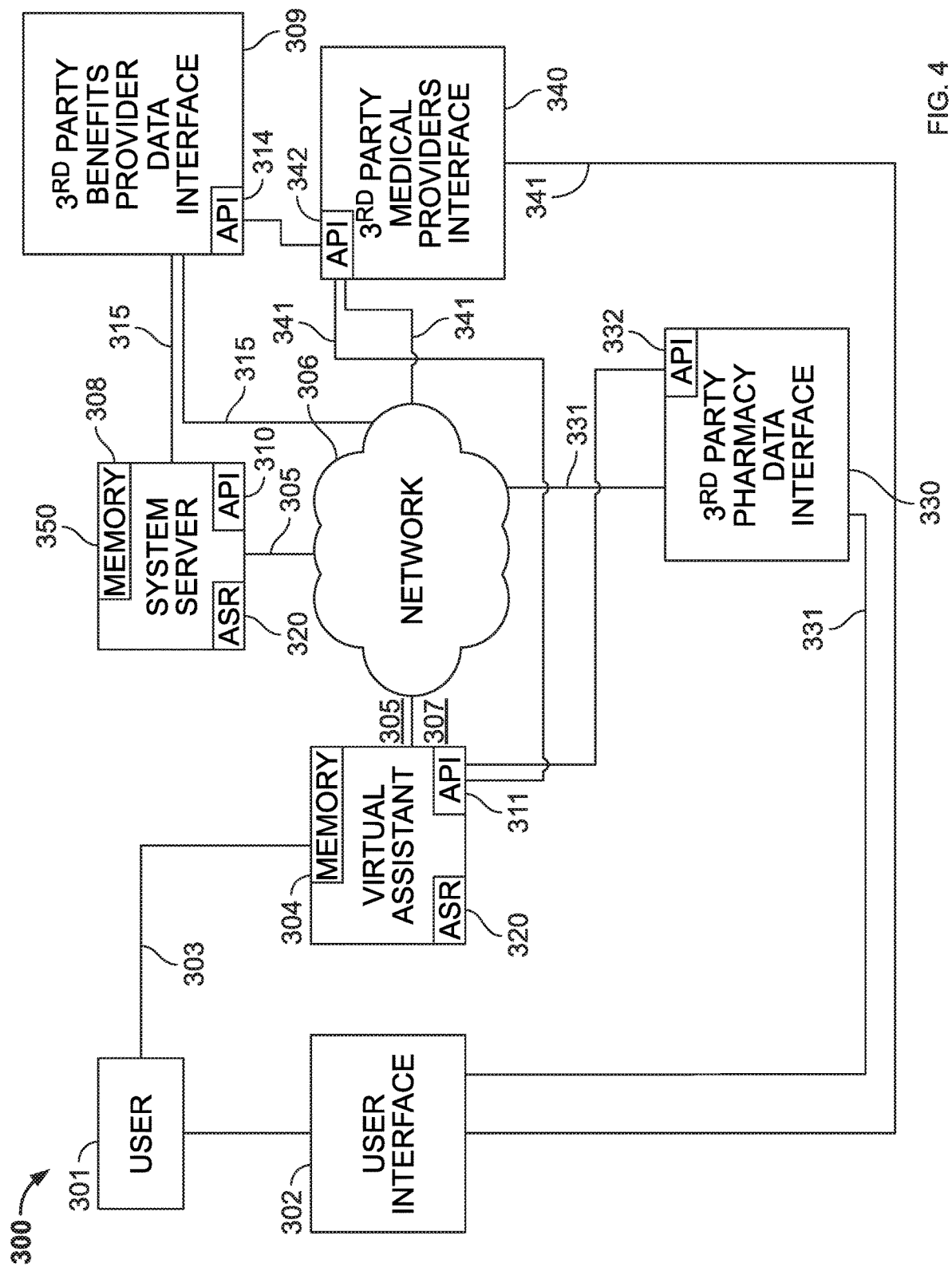
FIG. 4 is a block diagram of an embodiment of an artificial intelligence-based multi-channel system of the present invention for performing FIGS. 3A-3D.

FIG. 4 is a schematic diagram of an implementation of system 400. System 100 communicates with online advertising platform 200. Online advertising platform receives search terms from user 401 and communicates information to user 401. In one embodiment, online advertising platform 200 communicates a link to cognitive virtual assistant 404.

System 400 includes user interface 402 which is accessed by user 401. User interface 402 can be an electronic device such as a mobile telephony device including for example a mobile device, cell phone or smartphone. User interface 402 can include phone, mobile device, tablet, app, wearable computer device, SMS, chat, iMessage, videoconference, virtual reality, game or game system. Mobile telephony devices can communicate with fourth generation (4G) or fifth generation (5G) cellular communications. It will be appreciated that other mobile telephony devices and networks can be used in accordance with the teachings of the present invention. User interface 402 communicates audio or digital information to cognitive virtual assistant 404 over communication path 403.

Cognitive virtual assistant 404 can be a component which is artificial intelligence based. In one embodiment, cognitive virtual assistant receives audio over communication path 403. Audio can be digitized or interpreted by cognitive virtual assistant 404 into data 405. In one embodiment automated speech recognition (ASR) 420 can be performed at cognitive virtual assistant 404 or automated speech recognition (ASR) 421 can be performed at system server 408 to digitally convert received audible speech into transcribed text. Cognitive virtual assistant 404 can utilize commercial technologies including for example Sentiment Analysis, Tone Analyzer and Personality Insights to analyze data and adjust parameters of cognitive virtual assistant 404. Cognitive virtual assistant 404 can be implemented in a natural language conversational manner for receiving information from user 401 and automatically generating responses to user 401 during the conversation. Cognitive virtual assistant 404 can have cognitive learning abilities. Cognitive virtual assistant 404 can include natural language processing and context switching. Cognitive virtual assistant 404 can include semantic memory, episodic memory for learning from past conversations, analytic memory for understanding trend of data, affective memory for understanding emotion and deep back projection networks (DBPN) for learning process flows via empirical learning. In some embodiments, the part of speech of content of the utterance of cognitive virtual assistant 404 is determined based on using a natural language parser (e.g., Stanford NLP or others as are known in the art) to parse the utterance. Virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The part of speech of content of the utterance can indicate if the content is a noun phrase, verb phrase, and/or theme. In some embodiments, the domain of the content of the utterance of cognitive virtual assistant 404 is determined based on pattern matching. Cognitive virtual assistant 104 can include components such as a processor, memory, storage, microphone, learning module, and operating system. An example, cognitive virtual assistant or virtual producer is described in U.S. Pat. No. 9,812,151 hereby incorporated by reference into this application.

Data 405 is transferred over communication path 407 to network 406. Network 406 communicates with system server 408. For example network 406 can be the Internet. Cognitive virtual assistant 404 may include a server, computer, laptop, PC, mobile device, or the like that includes a processor, a memory, and a communication device. Cognitive virtual assistant 404 and system server 408 may include a plurality of computing devices connected together, e.g., via a network. The processor may include any general purpose or application-specific processor. The memory may include one or more tangible, non-transitory, machine-readable media.

System server 408 accesses third party data interface 409. For example, third party data interface 409 can be an interface to a third-party system for accessing third-party rate quote data. For example, server 408 can access third party data 415 directly from databases of third party providers. In one embodiment, application programming interface (API) 410 of system server 408 or application programming interface (API) 411 of cognitive virtual assistant 404 communicates with application programming interface (API) 412 of third party data interface 409 to access the features or data from third party data interface 409. Alternatively, system server 408 can access third party data 415 over network 406. Residential services can include home services. For example, third party data 415 can include third party pricing and requirements from multiple home services companies.

System server 408 or cognitive virtual assistant 404 can connect to residential services providers application interface 430. For example, residential services provider application interface 430 can be an interface to a third-party system for accessing residential services application or purchase requirements data 431. In one embodiment, application programming interface (API) 410 of system server 408 or application programming interface (API) 411 of cognitive virtual assistant 404 communicates with application programming interface (API) 432 of residential services application interface 430 to access the features or data from provider application interface 430. Alternatively, system server 408 can access residential services application or purchase requirements data 431 over network 406. For example, residential services application or purchase requirements data 431 can include data fields of the application relating to user information. In some embodiments, residential services application or purchase requirements data 431 can be directed to high-speed internet, live TV service, streaming TV service, landline telephone service, mobile cellular phone service, home security, and home automation products and services.

System server 408 or cognitive virtual assistant 404 can connect to residential services provider enrollment interface 440. For example, residential services provider enrollment interface 440 can be an interface to a third-party system for accessing enrollment data 441. In one embodiment, application programming interface (API) 410 of system server 408 or application programming interface (API) 411 of cognitive virtual assistant 404 communicates with application programming interface (API) 442 of residential services provider enrollment interface 440 to access the features or data from residential services provider enrollment interface 440. Alternatively, system server 408 can access enrollment data 441 over network 406. For example, enrollment data 441 can include product or service identification data and fulfillment data. In one embodiment, residential services provider enrollment interface 440 can send enrollment or purchase data 441 directly to user 401 through user interface 402 by voice, text or email. Data 405, third party data 415, application requirements data 431 and enrollment data 441 can be stored in memory 150 of system server 108.

Information collected from cognitive virtual assistant 404 can be forwarded from API 411 to online advertising platform 200 for analytics and optimization. Application requirements data 431 can be forwarded from API 432 to online advertising platform 200. In one embodiment, API 410, API 411, API 412, API 432 and API 442 are web based APIs.

Embodiments of the present invention can be implemented in connection with a special purpose or general purpose computer device that includes both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-implemented method for automatically completing by a cognitive virtual assistant, electronic application or electronic enrollment requirements of one or more products with user information received by the cognitive virtual assistant during a conversation between a user and the cognitive virtual assistant and automatically communicating, by the cognitive virtual assistant, the electronic application or electronic enrollment requirements to a respective one or more benefits providers or residential services providers comprising the steps of:
   a. matching one or more user search terms entered in an online advertising platform by the user to one or more pre-defined search terms at an online advertising platform and displaying a link, the user establishing a connection with a cognitive virtual assistant by using the link and receiving, by the cognitive virtual assistant, audible speech from the user during the conversation of user information directed to the one or more products;
   b. digitally converting, by the cognitive virtual assistant, the audible speech into transcribed text and generating audible responses at the cognitive virtual assistant by interpreting the transcribed text with artificial intelligence using cognitive learning abilities at a processor of a computer of the cognitive virtual assistant while adjusting parameters of the cognitive virtual assistant of language and tone of the audible responses from the cognitive virtual assistant during the conversation to accommodate the user, the one or more products being selected from personal lines insurance, commercial lines insurance, property insurance, casualty insurance, benefits products, benefits services and residential services;
   c. receiving, by the cognitive virtual assistant electronic third party data directed to the one or more products via one or more of third party data interfaces for the personal lines insurance, the commercial lines insurance, the property insurance, the casualty insurance, a benefits product application interface for the benefits products and the benefits services and a residential services provider application interface for the residential services;
   d. identifying, by the cognitive virtual assistant, eligibility of the user for purchase or enrollment in the one or more products based on eligibility determined from the user information received from the user by the cognitive virtual assistant during the conversation and the electronic third party data;
   e. automatically completing, by the cognitive virtual assistant, the electronic application or electronic enrollment requirements of the one or more products with the identified eligibility of the user from step d.;
   f. electronically communicating, by the cognitive virtual assistant, the electronic application or electronic enrollment requirements to the respective one or more benefits providers or residential services providers; and collecting information, by the cognitive virtual assistant, from the online advertising platform during one or more of steps a. through f.

2. The method of claim 1 wherein the user information includes answers to one or more pre-qualifying questions and the eligibility of the user for purchase or enrollment in the one or more products being based on answers to the one or more pre-qualifying questions.

3. The method of claim 1 further comprising the step of receiving, by the cognitive virtual assistant, electronic enrolled policy information or electronic enrolled product or service information after enrollment and presenting, by the cognitive virtual assistant, the electronic enrolled policy information or electronic enrolled product or service information.

4. The method of claim 1 wherein the user communicates with the cognitive virtual assistant with a user interface via audio, mobile device, tablet, app, wearable computer device, SMS, chat, iMessage, videoconference, virtual reality, game or game system.

5. The method of claim 1 further comprising the step of optimizing the online advertising platform using the collected information from the online advertising platform.

6. The method of claim 5 wherein the step of optimizing the online advertising platform includes optimizing ad position for each unique search query of the one or more search terms entered in the online advertising platform to increase or decrease a max cost-per click (CPC) based upon demographics of the user.

7. The method of claim 6 wherein the collected information from the online advertising platform includes tracking user click information using the online advertising platform and the step of optimizing uses the tracking user click information to generate a click tracking identification (ID) by the online advertising platform during step a. and the click tracking identification (ID) being used during steps b. through f.

8. The method of claim 5 wherein the step of optimizing the online advertising platform includes providing a status of the step of completing, by the cognitive virtual assistant, the electronic application or the electronic enrollment requirements of the one or more products to the online advertising platform.

9. A computer implemented system for automatically completing by a cognitive virtual assistant, electronic application or electronic enrollment requirements of one or more products with user information received by the cognitive virtual assistant during a conversation between a user and the cognitive virtual assistant and automatically communicating, by the cognitive virtual assistant, the electronic application or electronic enrollment requirements to a respective one or more benefits providers or residential services providers comprising:

a user interface communicating with a cognitive virtual assistant;

a system server communicating over a network to the cognitive virtual assistant; and one or more of a third party data interface, residential services provider application interface and benefits products application interface, the system performing the steps of:

matching one or more user search terms entered in an online advertising platform by the user to one or more pre-defined search terms at an online advertising platform and displaying a link, the user establishing a connection with the cognitive virtual assistant by using the link;

receiving, by the cognitive virtual assistant, audible speech from the user during the conversation of user information directed to the one or more products;

digitally converting, by the cognitive virtual assistant, the audible speech into transcribed text and generating audible responses by interpreting the transcribed text with artificial intelligence using cognitive learning abilities at a processor of the computer cognitive virtual assistant while adjusting parameters of the cognitive virtual assistant of language and tone of the audible responses from the cognitive virtual assistant during the conversation to accommodate the user, the one or more products being selected from personal lines insurance, commercial lines insurance, property insurance, casualty insurance, benefits products, benefits services and residential services;

receiving, by the cognitive virtual assistant electronic third party data directed to the one or more products via one or more of third party data interfaces for the personal lines insurance, the commercial lines insurance, the property insurance, the casualty insurance, a benefits product application interface for the benefits products and the benefits services and a residential services provider application interface for the residential services;

identifying, by the cognitive virtual assistant, eligibility of the user for purchase or enrollment in the one or more products based on eligibility determined from the user information received from the user by the cognitive virtual assistant during the conversation and the electronic third party data;

automatically completing, by the cognitive virtual assistant, electronic application or electronic enrollment requirements of the one or more products with the identified eligibility of the user from step d.;

electronically communicating, by the cognitive virtual assistant, the electronic application or electronic enrollment requirements to the respective one or more benefits providers or residential services providers; and collecting information, by the cognitive virtual assistant, from the online advertising platform and optimizing the online advertising platform using the collected information from the online advertising platform.

10. The system of claim 9 wherein the user communicates with the cognitive virtual assistant with a user interface via audio, mobile device, tablet, app, wearable computer device, SMS, chat, iMessage, videoconference, virtual reality, game or game system.

11. The system of claim 9 wherein the cognitive virtual assistant is determined based on a natural language parser.

12. The system of claim 9 wherein the step of optimizing the online advertising platform includes optimizing ad position for each unique search query of the one or more search terms entered in the online advertising platform of to increase or decrease a max cost-per click (CPC) based upon demographics of the user.

13. The system of claim 9 wherein a API on the server or the cognitive virtual assistant is activated to establish a connection with one or more of a API of the third party data interface, the benefits product application interface and the residential services provider application interface.

14. The system of claim 9 wherein the product is residential services and the data collected from the user includes one or more of VIN number, license plate, state, number of miles driven, address, zip code, type of dwelling, age of home, type of construction, and square footage.

15. The system of claim 9 wherein the residential services are mobile cellular, live TV, and streaming services.

16. A non-transitory computer-readable medium having stored thereon a plurality of sequences of instructions for automatically completing by a cognitive virtual assistant, electronic application or electronic enrollment requirements of one or more products with user information received by the cognitive virtual assistant during a conversation between a user and the cognitive virtual assistant and automatically communicating, by the cognitive virtual assistant, the electronic application or electronic enrollment requirements to a respective one or more benefits providers or residential services providers, said instructions including sequences of instructions which, when executed by at least one processor, cause said processor to perform the method steps of:

matching one or more user search terms entered in an online advertising platform by the user to one or more pre-defined search terms at an online advertising platform and displaying a link, the user establishing a connection with the cognitive virtual assistant by using the link;

receiving, by the cognitive virtual assistant, audible speech from the user during the conversation of user information directed to the one or more products;

digitally converting, by the cognitive virtual assistant, the audible speech into transcribed text and generating audible responses by interpreting the transcribed text with artificial intelligence using cognitive learning abilities at a processor of the computer cognitive virtual assistant while adjusting parameters of the cognitive virtual assistant of language and tone of the audible responses from the cognitive virtual assistant during the conversation to accommodate the user, the one or more products being selected from personal lines insurance, commercial lines insurance, property insurance, casualty insurance, benefits products, benefits services and residential services;

receiving, by the cognitive virtual assistant electronic third party data directed to the one or more products via one or more of third party data interfaces for the personal lines insurance, the commercial lines insurance, the property insurance, the casualty insurance, a benefits product application interface for the benefits products and the benefits services and a residential services provider application interface for the residential services;

identifying, by the cognitive virtual assistant, eligibility of the user for purchase or enrollment in the one or more products based on eligibility determined from the user information received from the user by the cognitive virtual assistant during the conversation and the electronic third party data;

automatically completing, by the cognitive virtual assistant, electronic application or electronic enrollment requirements of the one or more products with the identified eligibility of the user from step d.;

electronically communicating, by the cognitive virtual assistant, the electronic application or electronic enrollment requirements to the respective one or more benefits providers or residential services providers; and collecting, by the cognitive assistant, information from the online advertising platform, returning, by the cognitive virtual assistant, collected information to the online advertising platform and optimizing the online advertising platform using the collected information.

17. The non-transitory computer-readable medium of claim 16 wherein the optimization optimizing step includes optimizing ad position for each unique search query of the one or more search terms entered in the online advertising platform of to increase or decrease a max cost-per click (CPC) based upon demographics of the user.

* * * * *